Figure 1:
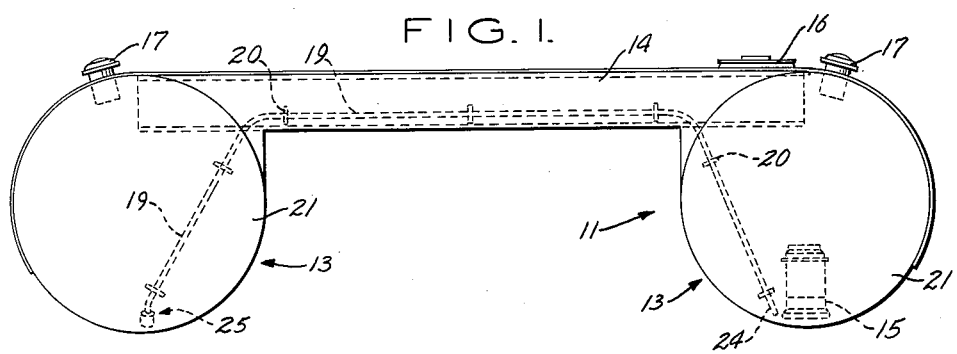

Feb. 20, 1962    T. R. CARTWRIGHT ET AL    3,021,855
SELF-MOTIVATING AUTOMATIC SYPHONING AND EQUALIZING TANK SYSTEM
Filed March 10, 1958

*INVENTORS*
THEODORE R. CARTWRIGHT
LOUIS A. WERNER
BY *Whittemore, Hulbert*
   *& Belknap*
ATTORNEYS United States Patent Office 3,021,855
Patented Feb. 20, 1962

3,021,855
SELF-MOTIVATING AUTOMATIC SYPHONING AND EQUALIZING TANK SYSTEM
Theodore R. Cartwright, 401 Clinton St., St. Clair, Mich., and Louis A. Werner, 9489 Hemonger St., Algonac, Mich.
Filed Mar. 10, 1958, Ser. No. 720,299
13 Claims. (Cl. 137—38)

The present invention relates to improvements in a multiple storage tank system, as typified by the so-called dual saddle tank or side-mounted tanks of a truck fuel system. Although herein illustrated and described as embodied in a saddle tank installation, it is to be understood that the principles of the invention are not limited in this respect, since a side mount installation is also contemplated as indicated above; and it is further contemplated that the improvement of the invention is applicable in installations other than of the automotive or truck type, for example, in a marine application, and the like.

It is a general object of the invention to provide a multiple tank unit for a mobile installation which is self-motivated or self-primed in operation to equalize the levels of the tanks of the unit solely in response to and in consequence of the motion of the unit on the installation in question, whether it be automotive, marine, etc.

In this connection, it is a general object of the invention to provide an automatic system or unit as described which is in full compliance with all existing safety codes governing the connection of fuel handling fittings to the tank structure.

Another object is to provide a self-motivated and equalized tank unit whose operation is occasioned by motion of the mobile carrier therefor, in which two or more tanks that are out of liquid communication with one another up to a substantial level above the bottoms thereof, as in a typical saddle or side-mounted, dual tank device, are connected with one another by self-priming and self-maintaining syphon means, the syphoning effect being placed in operation and sustained by the surging of the liquid in the tank arising from this motion, whether in decelerating or otherwise.

Yet another object is to provide a self-motivated and equalized tank unit for trucks and the like, in which the syphon means in question is constituted very simply and inexpensively of a conduit or pipe disposed in liquid communicating relation to the tanks of the installation, having its respective intake and discharge ends positioned adjacent the bottoms of the respective tanks, and bridging the latter in the manner of a syphon. In accordance with the invention, this conduit or pipe is provided, preferably adjacent its tank intake end, with an anti-back flow valve, so that the surge of the liquid in this tank produced by a movement of the latter occasions a flow of liquid into the intake end, and whereby repeated further surges force additional material into the conduit or pipe. The valve prevents reverse flow, and in a short time a syphon is set up at the output which insures thereafter the proper equalization of the levels of liquid in the two tanks of the installation.

It is a general object of the invention, in any installation according to the invention, to provide a unit in which the syphon conduit means just described has its intake end equipped with a valve-control intake mouth disposed at least in part horizontally. In the embodiment of the invention illustrated herein, the intake mouth opens rearwardly of the front wall of one of the tanks at an angle of 45° in order to initiate and maintain the syphon by surges of the liquid in the tank occurring upon deceleration. However, it is to be understood that the arrangement in regard to angularity and position in the tank lends itself to change, since it is the surging effect, regardless of its direction, which governs the improved action of the unit.

Figure 2:
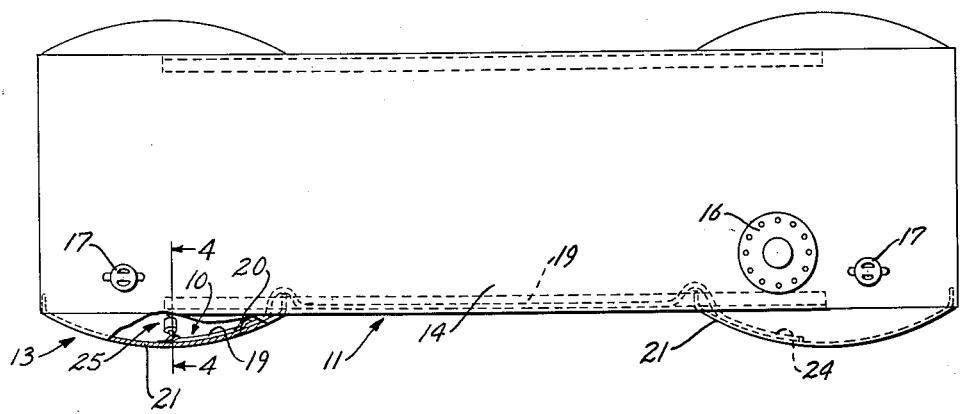
Figures 5, 6:
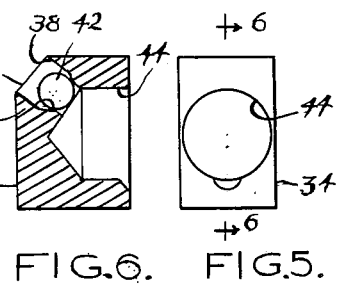
Figure 3:
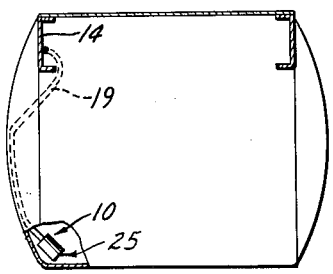
Figure 4:
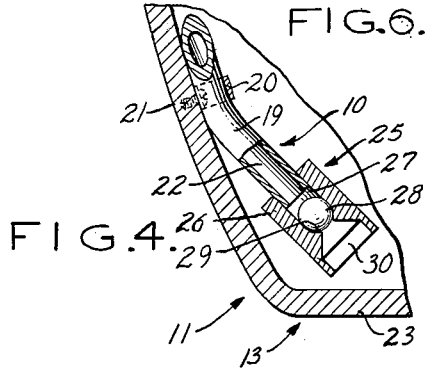

The foregoing as well as other objects will become more apparent as this description proceeds, especially when considered in connection with the accompanying drawings illustrating preferred embodiments of the invention, wherein:

FIG. 1 is a front elevational view of a dual tank unit in accordance with the invention, as embodied in a saddle type tank;
FIG. 2 is a top plan view, partially broken away and in horizontal section, of the unit;
FIG. 3 is a side elevational view of the unit, also partially broken away to show the one way surge valve thereof;
FIG. 4 is a view in vertical section along line 4—4 of FIG. 2, being in enlarged scale;
FIG. 5 is a front elevation of a modified form of surge valve; and
FIG. 6 is a sectional view on the line 6—6 of FIG. 5.

The improved self-motivating and automatic syphoning and equalizing system of the invention is illustrated in the figures of the drawings in the form of a unit generally designated 10 applied to a conventional saddle tank 11 of a type widely available for automotive truck and like installations. However, as indicated above, the principles of the invention are also generally applicable in the equalizing of other sorts of dual or multiple, divided tanks, for example, side mounts, and in fields other than the automotive. In fact, the invention lends itself admirably to the equalizing of multiple tanks of practically any sort which are characteristically movable as employed, so that the surges of the liquid contained in the tanks may be employed to first set up a self-primed syphon action between the tanks, and then maintain the syphon unbroken.

Saddle tank structure 10 comprises a pair of like cylindrical tanks 13 of conventional sort, conventionally bridged by a connecting hollow saddle section 14, and whether this type construction is involved or any other type of divided or separated tank construction, it is important that the unit 10 comply with existing codes forbidding the formation of openings in the walls of the tanks 13 below the normal liquid level therein.

A fuel pump 15 is schematicaly shown as mounted in the right hand tank 13, as viewed in FIG. 1, and a suitable hand hole is normaly closed by a removable cover 16, permitting access to the pump 15. Each tank is also equipped with a filling fitting covered by a removable closure cap 17. In these respects, mechanical features of the tank structure 10 are entirely conventional.

The automatic syphoning and equalizing system or unit 10 of the invention includes an elongated syphoning tube or conduit 19 which is of inverted U-shaped outline, and is disposed within the tanks 13 and connecting saddle portion 14, being secured to one of the walls of these portions, as by means of appropriate brackets 20. As illustrated in FIGS. 1, 2 and 3, it follows the forward wall portions 21 of the two tanks 13, angling inwardly and upwardly along the inner surfaces of the latter, thence across the inner surface of the forward wall of the saddle portion 14.

In accordance with the invention, conduit 19 has a lower intake end 22 terminating adjacent the bottom 23 of the left hand tank 13 (FIG. 1); and its opposite end has a discharge terminal 24 similarly positioned adjacent the bottom of the right hand tank 13, as viewed in FIG. 1.

Referring to FIG. 4 of the drawings, the intake end of the conduit 19 extends rearwardly and downwardly from the front wall 21 at an angle of approximately 45° to the horizontal. Its extremity is equipped with a one-way anti-back flow surge valve 25 in the form of a tubular housing 26 surrounding and secured to the conduit end 22. This housing is formed to provide an internal chamber 27 receiving a ball check element 28, and has a conical valve seat 29 upon which the ball 28 may engage and seal. Valve housing 25 has an enlarged terminal intake mouth 30.

In the operation of the system, a surge in fuel or other liquid in the left hand tank 13 (FIGS. 1 and 4), as in decelerating the truck or other vehicle or mobile mount for the tank structure 11, will drive the liquid into the valve intake mouth 30 and past the ball check 28 into the syphon conduit 19, the ball check preventing a return flow. Successive further surges repeat the effect, forcing the liquid up into the syphon or syphon tube 19 and in short order setting up a syphon by which fuel or other liquid is transferred to the other (or right hand) tank 13. Its level is thus kept equal with that in the syphon instituting tank. This operation takes place in a saddle tank whenever the liquid level falls beneath the connecting saddle portion 14.

It will be appreciated that the intake end of syphon tube 19 may well be positioned otherwise than as illustrated in FIG. 4, i.e., adjacent a rear or side wall of the tank, or, in fact, in any desired position therein, so long as its intake end or mouth has a horizontal component enabling a motion induced surge to cause the entry of liquid, and its upward travel as the surging continues.

Referring now to FIGS. 5 and 6 there is illustrated a modification of the surge and check valve. As seen in these figures, the valve is formed from a rectangular block 34 one upper corner of which is beveled as indicated at 36. A recess 38 is extended into the body terminating in a conically tapered portion 40 the angle of which is such that the vertically upwardly facing surface, to which the reference character 40 has been applied extends downwardly and to the right at a small angle as for example three degrees. This arrangement is such that a ball check valve 42 is given a slight gravitational bias toward closed position. Extending into the face of the block 34 is a relatively enlarged recess 44 which faces horizontally and in the particular embodiment of the invention under discussion, is located at the front of a tank and faces the rear thereof. The recess 44 is bored and is hence of cylindrical configuration. Accordingly, fluid located within the recess 44 is restrained against lateral movement and when there is a surge of fuel in the tank, it is most effective to provide an upward surge of fuel through the recess 38 and past the check valve 42 and into a suitable syphon tube such as the tube 19.

The drawings and the foregoing specification constitute a description of the improved self-motivating automatic syphoning and equalizing tank system in such full, clear, concise and exact terms as to enable any person skilled in the art to practice the invention, the scope of which is indicated by the appended claims.

What we claim as our invention is:

1. A multiple tank unit adapted for a mobile installation and self motivated by the motion of the installation to equalize tank levels, comprising a plurality of liquid containers, and a syphon conduit extending between said containers and having an intake portion in one thereof provided with an intake mouth which is disposed at least in part horizontally to receive liquid for upward flow in said intake portion under the force of liquid surges occasioned by the motion of the tank unit.

2. A multiple tank unit adapted for a mobile installation and self motivated by the motion of the installation to equalize tank levels, comprising a plurality of liquid containers which are out of mutually equalizing liquid communication with one another at least up to a level substantially above the bottom of one thereof, and syphon conduit means extending between said containers and having a portion discharging to one of said containers and an intake portion extending downwardly in the other container at an elevation adjacent the bottom thereof, said intake portion having an intake mouth which is disposed at least in part horizontally to receive liquid from said other container for upward flow in said intake portion under the force of liquid surges occasioned by the motion of the tank unit.

3. A multiple tank unit adapted for a mobile installation and self motivated by the motion of the installation to equalize tank levels, comprising a plurality of liquid containers which are out of mutually equalizing liquid communication with one another up to a level substantially above the bottom of at least one thereof, and syphon conduit means extending between said containers and having a portion discharging to one of said containers and an intake portion extending downwardly in the other container beneath said level, said intake portion having an intake mouth which is disposed at least in part horizontally to receive liquid from said other container for upward flow in said intake portion under the force of liquid surges occasioned by the motion of the tank unit, said conduit means being provided with means tending to prevent liquid flow therein toward said intake mouth.

4. A self equalizing multiple tank unit adapted for a mobile installation and self motivated by the motion of the installation, comprising a pair of separated tanks out of mutually equalizing liquid communication with one another up to a level substantially above the bottom of at least one thereof, and a syphon conduit connected between said tanks and having a terminal portion discharging to one of said tanks and an intake portion disposed in the other tank beneath said level, said intake portion having an intake mouth which is positioned to receive liquid from said other tank under the force of liquid surges therein.

5. A multiple tank unit which is adapted for a mobile installation and which is self motivated and equalized as to liquid level by the motion of the installation, comprising a pair of tanks separated from one another and out of mutually equalizing liquid communication with one another up to an elevation substantially above the bottom thereof, and a syphon conduit of inverted U-shape connected between said tanks and having a portion discharging downwardly to one of said tanks adjacent its bottom and an intake portion disposed adjacent the bottom of the other tank, said intake portion being provided with a fitting having an enlarged intake mouth disposed at an angle to the vertical to receive liquid from said other tank under the force of liquid surges therein occasioned by the motion of the tank unit, said fitting being provided with an anti-back flow valve to prevent liquid flow in said conduit toward said intake mouth.

6. A multiple tank unit in accordance with claim 5, in which said tank unit is a saddle type including a portion connecting said tanks in liquid communication with one another adjacent the tops thereof.

7. A multiple tank unit in accordance with claim 5, in which said tank unit is a saddle type including a portion connecting said tanks in liquid communication with one another adjacent the tops thereof, and in which said syphon conduit is a tube disposed internally of said tanks and connecting portion.

8. A fuel system for a vehicle comprising a pair of tanks disposed in lateral separated position at approximately the same level, a fuel pump in one of said tanks having its intake adjacent the bottom thereof, a syphon tube interconnecting said tanks including an inlet leg in the other one of said tanks adjacent the bottom thereof and an outlet leg in said one tank adjacent the bottom thereof, said syphon tube entering both of said tanks at points above the normal upper limit of fuel level therein, said inlet leg including an enlarged port facing substantially in a direction to receive a surge of fuel occasioned by a change in the condition of movement of said fuel system and effective to displace fuel upwardly in the inlet leg of said syphon tube to fill the tube and to initiate a syphoning action as fuel is withdrawn from said one tank by said fuel pump.

9. A fuel system as defined in claim 8 in which the enlarged port is a part of a surge valve having a valve seat and a check valve cooperable with said valve seat and effective to prevent flow of fluid out of said inlet leg of said syphon tube into said other tank.

10. A fuel system as defined in claim 9 in which said check valve is a ball, and which includes a ball supporting surface when said ball is off its seat which inclines at a small angle toward said valve seat.

11. In a fuel system including a syphon tube interconnecting a pair of fuel tanks one of which is provided with a fuel pump, a surge and check valve at the inlet end of said tube adjacent the bottom of the other fuel tank, said valve comprising a portion including a passage extending downwardly at an angle between 35 and 55 degrees from the horizontal, a conically tapered portion at the inner end of said passage, said conically tapered portion being disposed such that a straight element at the bottom thereof is inclined downwardly at an angle of less than five degrees, the inner end of said conically tapered portion constituting a valve seat, a ball check valve in said passage movable by gravity on said inclined element of the conical surface onto said ball seat, an enlarged chamber having a cross-sectional area at least twice that of said passage and facing horizontally to be subjected to surges of fuel within said tank caused by changes in the state of motion thereof.

12. A self-syphoning, mobile liquid retaining unit motivated by movement thereof bodily, comprising a mobile liquid container of substantial rigidity and non-deformable in the normal use thereof, and a syphon conduit including an intake portion disposed in said container having an intake mouth which is positioned to receive liquid from said container and initiate syphoning action in said conduit under the force of liquid surges in the container due to said movement of the unit bodily.

13. A self-syphoning, mobile liquid retaining unit motivated by movement thereof bodily, comprising a mobile liquid container of substantial rigidity and non-deformable in the normal use thereof, and a syphon conduit extending from said container and including an intake portion disposed in said container having an enlarged intake mouth which is positioned to open transversely of the conduit to receive liquid from said container and initiate syphoning action in said conduit under the force of liquid surges in the container due to said movement of the unit bodily.

References Cited in the file of this patent

UNITED STATES PATENTS

| | | |
|---|---|---|
| 103,564 | Catlin | May 31, 1870 |
| 1,788,709 | De Spain | Jan. 13, 1931 |
| 2,193,170 | George | Mar. 12, 1940 |
| 2,652,849 | Ebbs | Sept. 22, 1953 |
| 2,821,993 | Pacey | Feb. 4, 1958 |
| 2,830,608 | Miller | Apr. 15, 1958 |